United States Patent
Wisbar et al.

(10) Patent No.: US 12,470,116 B2
(45) Date of Patent: Nov. 11, 2025

(54) ROTOR, ELECTRIC MOTOR AND METHOD FOR REDUCING THE UNBALANCE OF A ROTOR

(71) Applicant: Schaeffler Technologies AG & Co. KG, Herzogenaurach (DE)

(72) Inventors: Patrick Wisbar, Rastatt (DE); Alexandre Fischer, Strasbourg (FR); Thomas Fritz, Malsch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 591 days.

(21) Appl. No.: 17/641,601

(22) PCT Filed: Aug. 25, 2020

(86) PCT No.: PCT/DE2020/100748
§ 371 (c)(1),
(2) Date: Mar. 9, 2022

(87) PCT Pub. No.: WO2021/047726
PCT Pub. Date: Mar. 18, 2021

(65) Prior Publication Data
US 2022/0320978 A1    Oct. 6, 2022

(30) Foreign Application Priority Data
Sep. 10, 2019  (DE) ..................... 10 2019 124 186.3

(51) Int. Cl.
*H02K 15/165* (2025.01)
*H02K 1/276* (2022.01)
*H02K 1/28* (2006.01)

(52) U.S. Cl.
CPC .......... *H02K 15/165* (2013.01); *H02K 1/276* (2013.01); *H02K 1/28* (2013.01); *H02K 2213/03* (2013.01)

(58) Field of Classification Search
CPC ........ H02K 15/165; H02K 1/276; H02K 1/28; H02K 7/04
See application file for complete search history.

(56) References Cited

U.S. PATENT DOCUMENTS

| 5,091,668 A * | 2/1992 | Cuenot | H02K 1/2773 |
| | | | 310/410 |
| 6,144,131 A | 11/2000 | Hollenbeck et al. | |
| 7,642,691 B2 * | 1/2010 | Morita | H02K 21/044 |
| | | | 310/263 |

(Continued)

FOREIGN PATENT DOCUMENTS

| CN | 102067411 A | 5/2011 |
| CN | 102484404 A | 5/2012 |

(Continued)

*Primary Examiner* — Jeffrey T Carley
*Assistant Examiner* — Jose K Abraham
(74) *Attorney, Agent, or Firm* — Volpe Koenig

(57) ABSTRACT

The disclosure relates to a rotor for an electric motor, having a laminated rotor core which is rotatable about a rotation axis and has a first rotor lamination and a second rotor lamination, which is arranged axially next to the first motor lamination, and having a plurality of magnet cutouts in each of which magnets are arranged and secured. The disclosure further relates to an electric motor having a rotor and a method for reducing the unbalance of a rotor.

17 Claims, 4 Drawing Sheets

(56) References Cited

U.S. PATENT DOCUMENTS

| | | | | |
|---|---|---|---|---|
| 2006/0186752 | A1* | 8/2006 | Matsumoto | B60L 15/20 |
| | | | | 310/156.53 |
| 2008/0224558 | A1* | 9/2008 | Ionel | H02K 1/2766 |
| | | | | 310/156.57 |
| 2009/0224624 | A1* | 9/2009 | Kumar | H02K 1/246 |
| | | | | 310/156.53 |
| 2011/0031843 | A1* | 2/2011 | Liang | H02K 1/2773 |
| | | | | 310/216.096 |
| 2011/0316382 | A1* | 12/2011 | Komada | H02K 15/03 |
| | | | | 29/598 |
| 2012/0133229 | A1* | 5/2012 | Jayasoma | H02K 1/28 |
| | | | | 310/156.01 |
| 2012/0248918 | A1* | 10/2012 | Itou | H02K 1/276 |
| | | | | 29/598 |
| 2013/0154426 | A1* | 6/2013 | Melfi | H02K 21/46 |
| | | | | 310/156.78 |
| 2014/0062243 | A1* | 3/2014 | Falk | H02K 1/28 |
| | | | | 310/156.08 |
| 2014/0062252 | A1* | 3/2014 | Nagahiro | H02K 1/2766 |
| | | | | 310/216.048 |
| 2014/0117791 | A1* | 5/2014 | Fiseni | H02K 29/12 |
| | | | | 29/598 |
| 2014/0265702 | A1* | 9/2014 | Li | H02K 1/276 |
| | | | | 310/156.38 |
| 2014/0265707 | A1* | 9/2014 | Klein | H02K 29/03 |
| | | | | 29/598 |
| 2015/0069863 | A1* | 3/2015 | Papini | H02K 1/2766 |
| | | | | 310/46 |
| 2015/0084469 | A1 | 3/2015 | Yazaki | |
| 2015/0108867 | A1* | 4/2015 | Nakagawa | H02K 7/14 |
| | | | | 310/156.47 |
| 2015/0180293 | A1* | 6/2015 | Schmid | H02K 1/32 |
| | | | | 310/216.124 |
| 2015/0357879 | A1* | 12/2015 | Radwainski | H02K 7/04 |
| | | | | 310/51 |
| 2016/0211711 | A1* | 7/2016 | Yazaki | H02K 1/276 |
| 2017/0040853 | A1* | 2/2017 | Totaro | H02K 21/22 |
| 2017/0366056 | A1* | 12/2017 | Tang | H02K 1/2766 |
| 2018/0269732 | A1* | 9/2018 | Lee | H02K 1/276 |
| 2018/0367004 | A1* | 12/2018 | Xu | H02K 1/2766 |
| 2019/0068012 | A1* | 2/2019 | Yazaki | H02K 1/276 |
| 2019/0207444 | A1* | 7/2019 | Wolf | H02K 1/28 |
| 2020/0127514 | A1* | 4/2020 | Ohzu | H02K 1/276 |
| 2020/0204018 | A1* | 6/2020 | Hyoguchi | H02K 1/276 |
| 2020/0274408 | A1* | 8/2020 | Ichien | B62D 5/0406 |

FOREIGN PATENT DOCUMENTS

| | | | |
|---|---|---|---|
| CN | 203434768 U | 2/2014 | |
| CN | 104052179 A | 9/2014 | |
| CN | 104704721 A | 6/2015 | |
| CN | 204633489 U | 9/2015 | |
| CN | 207968110 U | 10/2018 | |
| DE | 10 2018 001138 A1 | 9/2018 | |
| FR | 2421498 A1 | 10/1979 | |
| GB | 1541109 A | 2/1979 | |
| JP | 2002 218726 A | 8/2002 | |
| WO | WO-2019069547 A1 * | 4/2019 | H02K 1/27 |

* cited by examiner

ROTOR, ELECTRIC MOTOR AND METHOD FOR REDUCING THE UNBALANCE OF A ROTOR

CROSS-REFERENCE TO RELATED APPLICATIONS

This application is the U.S. National Phase of PCT Appln. No. PCT/DE2020/100748, filed Aug. 25, 2020, which claims priority from German Patent Application No. DE 10 2019 124 186.3, filed Sep. 10, 2019, the entire disclosures of which are incorporated by reference herein.

TECHNICAL FIELD

The disclosure relates to a rotor. Furthermore, the disclosure relates to an electric motor comprising a rotor and to a method for reducing the unbalance of a rotor.

BACKGROUND

An electric motor is generally known. This has a stator and a rotor, which can be rotated about a rotation axis relative to the stator, having a laminated rotor core consisting of a plurality of rotor laminations arranged axially next to one another. A plurality of magnet cutouts, in which magnets are respectively arranged and secured, are arranged in the laminated rotor core. The magnets can convert the magnetic field provided by the stator into a torque on the rotor.

In order to reduce the dynamic loads on the electric motor, it is necessary to keep the unbalance of the rotatable rotor as low as possible. Especially at the high speeds of an electric motor, even a slight unbalance is disadvantageous for reliable and efficient operation. After assembly of the laminated rotor core and construction of the rotor, it is known to use measurements to detect the unbalance and then to reduce it by processing to remove material or by increasing the mass, for example by attaching balancing masses. The removal of material by machining or drilling is extremely critical in the case of rotors which have magnets, since the removed material particles can adhere to the magnets and can have an extremely adverse effect on the operation of the electric motor.

SUMMARY

The object of the present disclosure is to reduce the unbalance of a rotor. Furthermore, the rotor should be able to be constructed more simply, more quickly and more reliably. The risk of incorrect assembly of the rotor lamination in the laminated rotor core should be reduced. The electric motor should be simpler, more reliable and less expensive. The unbalance within the rotor should already be reduced constructionally or before assembly.

At least one of these objects is achieved by a rotor having the features disclosed herein. As a result, a predetermined alignment of the rotor lamination can be implemented quickly and easily via the deviating cutout and the unbalance of the rotor lamination can be reduced by the same volume of the cutout. For example, the specified orientation can be required when assembling the laminated rotor core or during further processing of the rotor lamination.

The magnet cutouts can be arranged in the first and/or second rotor lamination. The magnet cutouts can be punched out of the respective rotor lamination.

The magnets can be permanent magnets. The magnets can be secured in the laminated rotor core in a form-fitting, force-fitting or materially-bonded manner. The magnets can be glued into the laminated rotor core with adhesive.

The cutouts can be punched out of the respective rotor lamination. The modified shape of the first cutout can enable a targeted assembly alignment of the associated rotor lamination in the laminated rotor core. The cutouts can be arranged on a common mean diameter. The cutouts can be arranged rotationally symmetrically.

In a preferred embodiment of the disclosure, in addition to the first cutout, a second cutout of the plurality of cutouts has a different shape than the plurality of cutouts but has the same cutout volume as the plurality of cutouts, wherein the second cutout is offset from the first cutout by an angle unequal to 180°. As a result, a specified lateral alignment of the rotor lamination can be achieved in addition to the specified alignment.

In a special embodiment of the disclosure, the cutouts are arranged radially inside of the magnet cutouts. This can reduce the effect of the changed shape on the unbalance.

In a further special embodiment of the disclosure, the cutouts are arranged equidistantly around the entire circumference.

In a preferred embodiment of the disclosure, in the rotor lamination having the cutouts, to reduce the unbalance of the rotor lamination at least one of the cutouts or at least a first cutout of a plurality of further cutouts has a cutout volume that is modified compared to the plurality of the respective cutouts. This allows the unbalance to be fine-tuned.

In a special embodiment of the disclosure, the cutouts are cooling fluid openings through which a cooling fluid can flow for cooling the laminated rotor core.

Furthermore, to achieve at least one of the aforementioned objects, a rotor is provided with at least one of the aforementioned features, wherein the first rotor lamination has a first unbalance and the second rotor lamination has a second unbalance and the first rotor lamination in the laminated rotor core is rotated by an offset angle with respect to the second rotor lamination to reduce an overall unbalance of the rotor laminated core. As a result, a systematic unbalance in the laminated rotor core can be reduced. A systematically present unbalance on the rotor laminations can be an unbalance characterized by a constant circumferential position, which can arise in particular through a rolling process of the rotor laminations.

In a preferred embodiment of the disclosure, the offset angle is formed by an integer division of the full circumference. The offset angle can depend on the number of rotor laminations in a laminated rotor assembly, within which the sum of the individual offset angles is equal to 360°. The laminated rotor core can have at least one laminated rotor core or a plurality of these arranged axially one behind the other. With two, the offset angle can be 180°, with three, the offset angle can be 120°, with four, the offset angle can be 90°, with six, the offset angle can be 60°, with eight, the offset angle can be 45° and with twelve rotor laminations within one rotor lamination composite, the offset angle can be 30°.

Furthermore, an electric motor for a drive train of a vehicle is proposed for achieving at least one of the aforementioned objects, comprising a stator and a rotor rotatable relative to the stator and having at least one of the aforementioned features.

The electric motor can be a permanently excited synchronous motor. The electric motor can provide drive torque to move the vehicle. The drive train can be a hybrid drive train. The vehicle can be an electric vehicle.

Furthermore, to achieve at least one of the aforementioned objects, a method for reducing the unbalance of a rotor is provided with at least one of the aforementioned features, wherein the magnets are secured by adhesive and the unbalance of the laminated rotor core with magnets is reduced, in which an overall unbalance of the laminated rotor core is detected, a first circumferential position in the area of a magnet cutout and a mass difference by a mass increase is specified, via which the total unbalance is reduced assuming a mass increase by the mass difference at the first circumferential position, and subsequently further adhesive in the amount of the mass difference is introduced into the magnet cutout at least the first circumferential position to reduce the overall unbalance.

Further advantages and advantageous embodiments of the disclosure result from the description of the figures and the drawings.

BRIEF DESCRIPTION OF THE DRAWINGS

The disclosure is described in detail below with reference to the drawings. Specifically.

DETAILED DESCRIPTION

Figure 1:
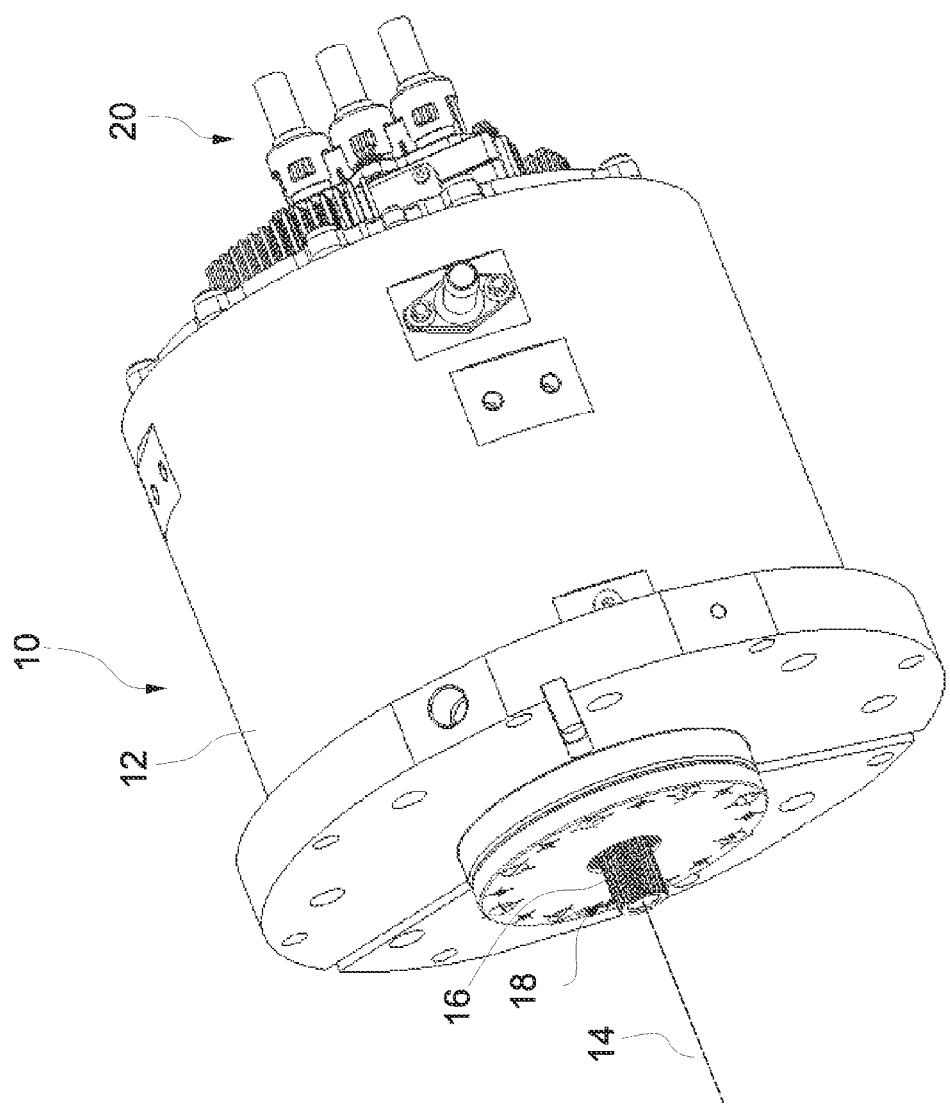
FIG. 1: shows a three-dimensional view of an electric motor in a specific embodiment of the disclosure.

FIG. 1 shows a three-dimensional view of an electric motor 10 in a specific embodiment of the disclosure. The electric motor 10 is designed as a permanently excited synchronous motor and has a stator 12 and a rotor arranged radially inside the stator 12 so as to be rotatable about a rotation axis 14. The rotor is connected to a motor shaft 16 in a non-rotatable manner. The motor shaft 16 comprises a toothing 18 for connection to a connecting component for transmitting drive torque caused by the rotor.

The stator 12 is supplied with electrical energy via three motor phase leads 20. Several coils built up by wire winding are arranged in the stator 12, via which the electrical energy is converted into an electromagnetic field acting on the rotor. The heat energy thus generated during operation of the electric motor 10 is dissipated via a motor cooling means.

Figure 2:
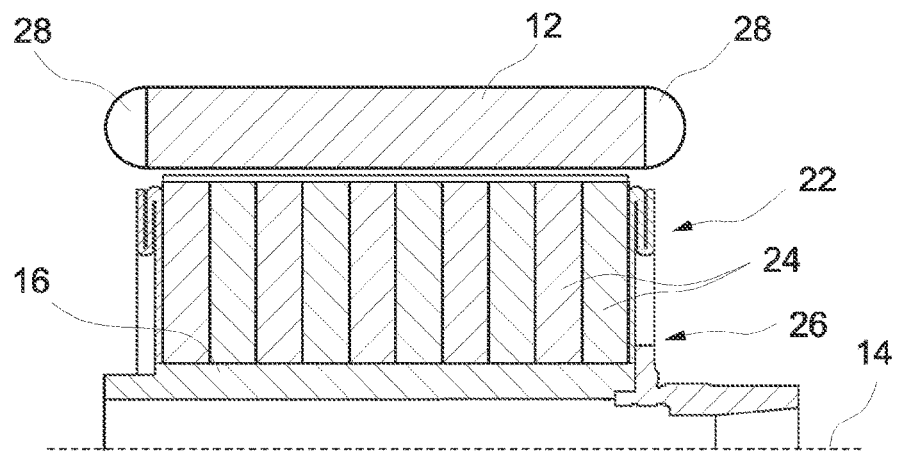
FIG. 2: shows a half section through an electric motor in another specific embodiment of the disclosure.

FIG. 2 shows a half section of an electric motor 10 in another specific embodiment of the disclosure. The rotor 22 has a plurality of rotor laminations 24 arranged axially adjacent to one another and rotatable as a whole about the rotation axis 14, which are connected in a non-rotatable manner to the motor shaft 16 and form a laminated rotor core 26. The individual rotor laminations 24 can be stamped from sheet metal.

The stator 12 has a plurality of circumferentially distributed wire-wound coils 28 which can be supplied with electrical energy and, depending thereon, cause a magnetic field acting on the laminated rotor core 26. Magnets, which are configured as permanent magnets, are received in the laminated rotor core 26. The magnets convert the magnetic field into a torque that is transmitted to the motor shaft 16.

Figure 3:
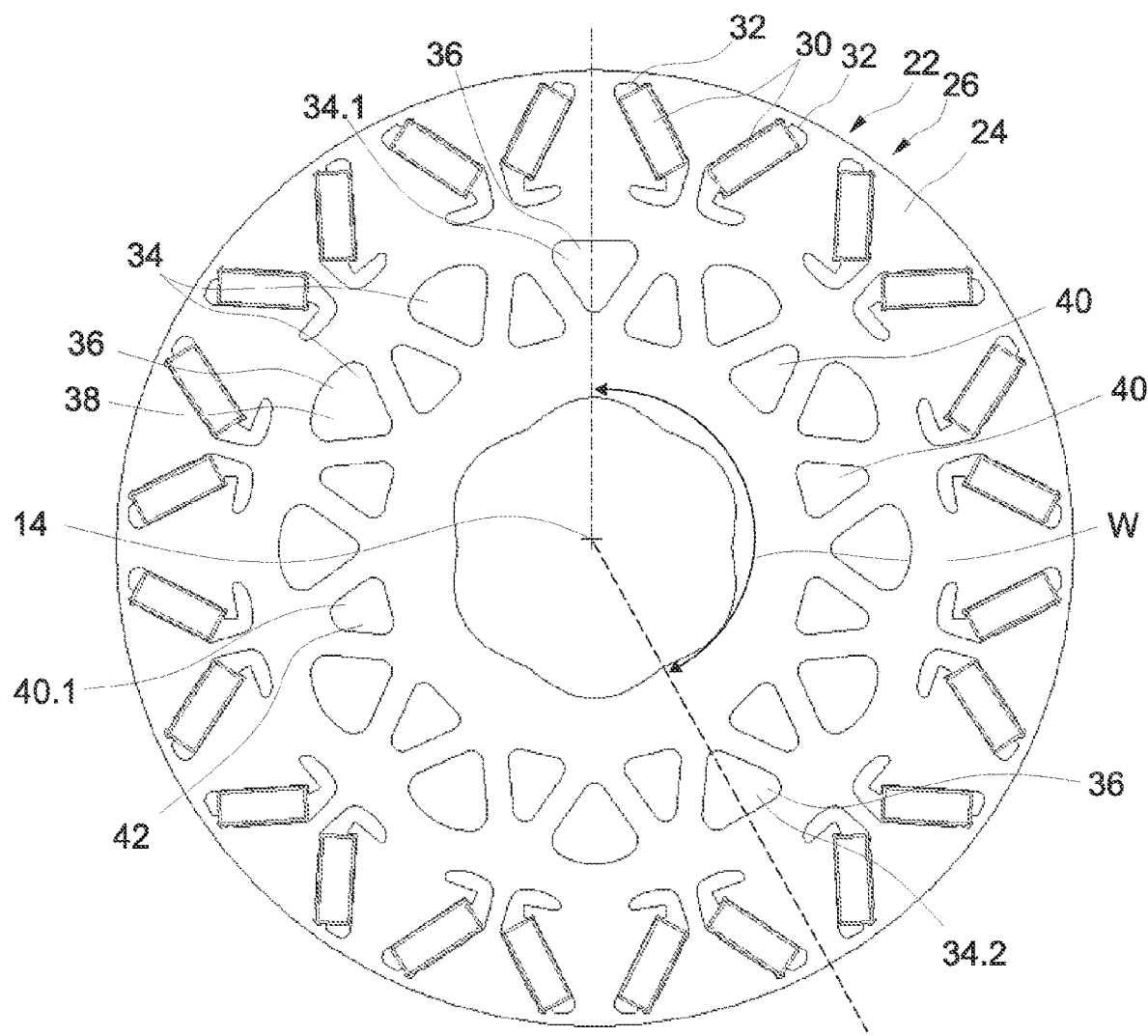
FIG. 3: shows a side view of a rotor lamination of a rotor in a specific embodiment of the disclosure.

FIG. 3 shows a top view of a rotor lamination 24 of a rotor 22 in a specific embodiment of the disclosure. The rotor lamination 24 rotatable about the rotation axis 14 is assigned to a laminated rotor core 26 and has a plurality of magnets 30 distributed circumferentially and received in a respective magnet cutout 32 in the rotor lamination 24, preferably stamped from the rotor lamination 24. The magnets 30 are configured as permanent magnets and distributed evenly around the circumference in order to keep an unbalance in the rotor lamination 24 as low as possible and to provide a required number of poles in the rotor lamination 24. The magnets 30 are glued into the respective magnet cutout 32 with an adhesive. In particular, the magnet cutout 32 extends axially through the rotor lamination 24 and the magnet 30 is arranged to be axially continuous in the magnet cutout 32.

A plurality of cutouts 34 are distributed around the circumference in a ring section lying radially inside of the magnet cutouts 32. The cutouts 34 can be cooling fluid openings for a cooling fluid to flow through to cool the laminated rotor core 26. The cutouts 34 are arranged equidistantly around the entire circumference and are designed to be axially continuous in the rotor lamination 24 and each have a cutout volume 36 which is formed by an axial length and a cross-sectional area 38. The cutouts 34 are preferably stamped out of the rotor lamination 24. The magnet cutouts 32 and the cutouts 34 can be formed in a stamping process.

A first cutout 34.1 of the plurality of cutouts 34 has a different shape than the plurality of cutouts 34 but the same cutout volume 36 as the plurality of cutouts 34. The modified shape of the first cutout 34.1 allows a specified alignment of the rotor lamination 24 to be implemented correctly, for example when assembling the laminated rotor core 26, and reduces the risk of incorrect assembly of the rotor lamination 24 during assembly to form the laminated rotor core 26. The unbalance of the rotor lamination 24 is reduced by the constant cutout volume 36.

A second cutout 34.2 of the plurality of cutouts 34 also has a different shape than the remaining cutouts 34 left out of the first cutout 34.1, which is in particular the same as the shape of the first cutout 34.1. The cutout volume 36 of the second cutout 34.1 is equal to that of the cutouts 34. The second cutout 34.2 is arranged offset from the first cutout 34.1 by an angle W not equal to 180°. As a result, a fixed lateral alignment of the rotor lamination 24 can be achieved via the second cutout 34.2 in conjunction with the first cutout 34.1 in addition to the predetermined alignment, in particular when the rotor lamination 24 is assembled into the laminated rotor core 26 or during further processing.

Further cutouts 40 are arranged equidistantly over the entire circumference in the rotor lamination 24. The other cutouts 40 are arranged circumferentially alternately with the cutouts 34 and cause a reduction in the mass moment of inertia of the rotor lamination 24. A first cutout 40.1 of the further cutouts 40 has a different cutout volume 42 compared to the majority of the further cutouts 40. As a result, an unbalance in the rotor lamination 24 can be further reduced.

Figure 4:
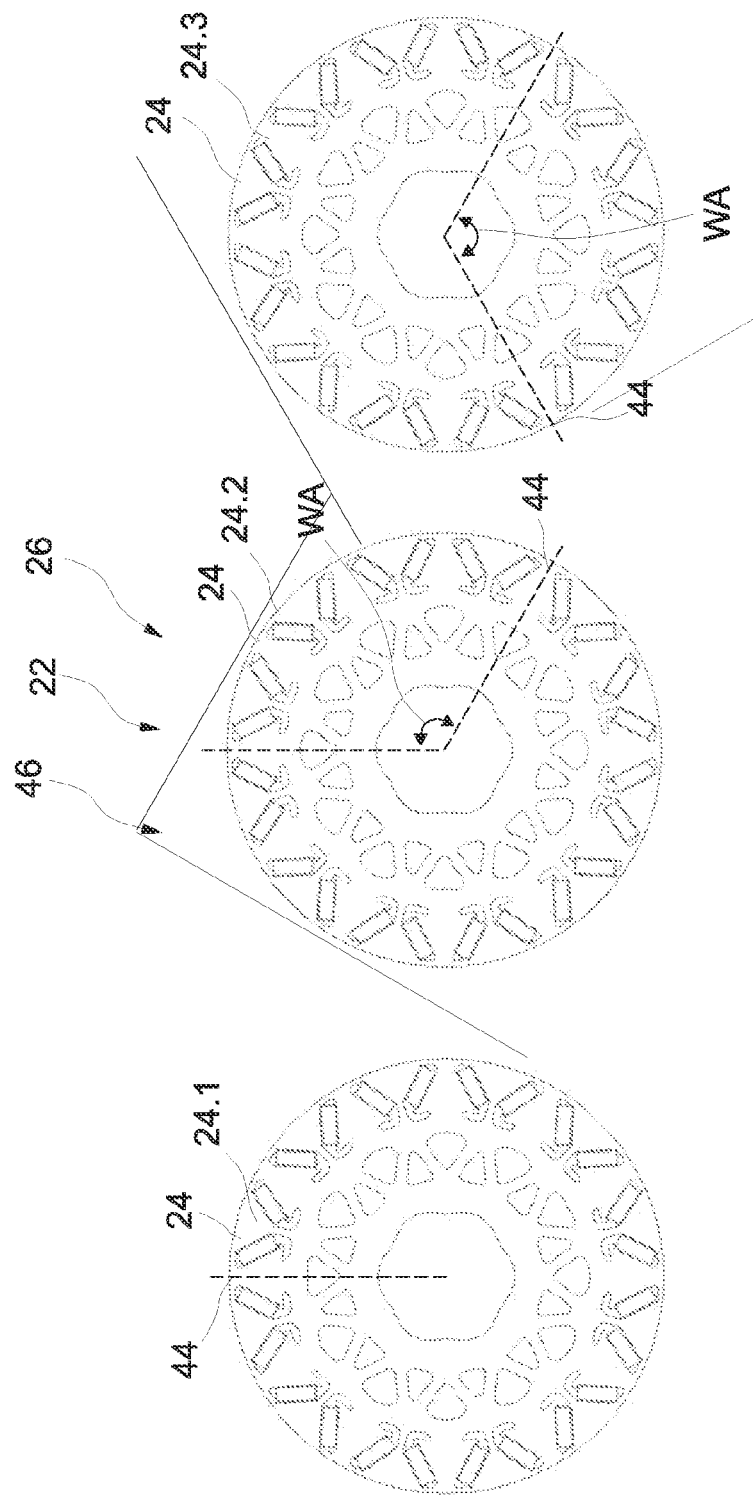
FIG. 4: shows a side view of a plurality of rotor laminations of a rotor in a further specific embodiment of the disclosure.

FIG. 4 shows a side view of a plurality of rotor laminations 24 of a rotor 22 in a further specific embodiment of the disclosure. The rotor laminations 24 are all shown in the circumferential orientation in which assembly to form the laminated rotor core 26 also takes place. A systematically present unbalance on the rotor laminations 24 is, for example, an unbalance characterized by a circumferential position 44 that remains the same. In particular, a rolling process during the production of the rotor laminations 24 along a rolling direction that remains the same can trigger such a systematic unbalance.

In order to reduce this systematic unbalance, the rotor laminations 24 are combined in a rotor lamination composite 46 consisting of three rotor laminations 24 as shown here. The rotor lamination composite 46 comprises a first rotor lamination 24.1 and a second rotor lamination 24.2, which is aligned rotated relative to the first rotor lamination 24.1 by an offset angle WA equal to 120°. A third rotor lamination 24.3 is arranged rotated relative to the second rotor lamination 24.2 by the offset angle WA. The rotor laminations 24 aligned in this way form the rotor lamination composite 46 and are assembled in this alignment, if necessary, with other rotor laminations combined in a respective rotor lamination composite and also rotated by the offset angle WA in the laminated rotor core 26.

Figure 5:
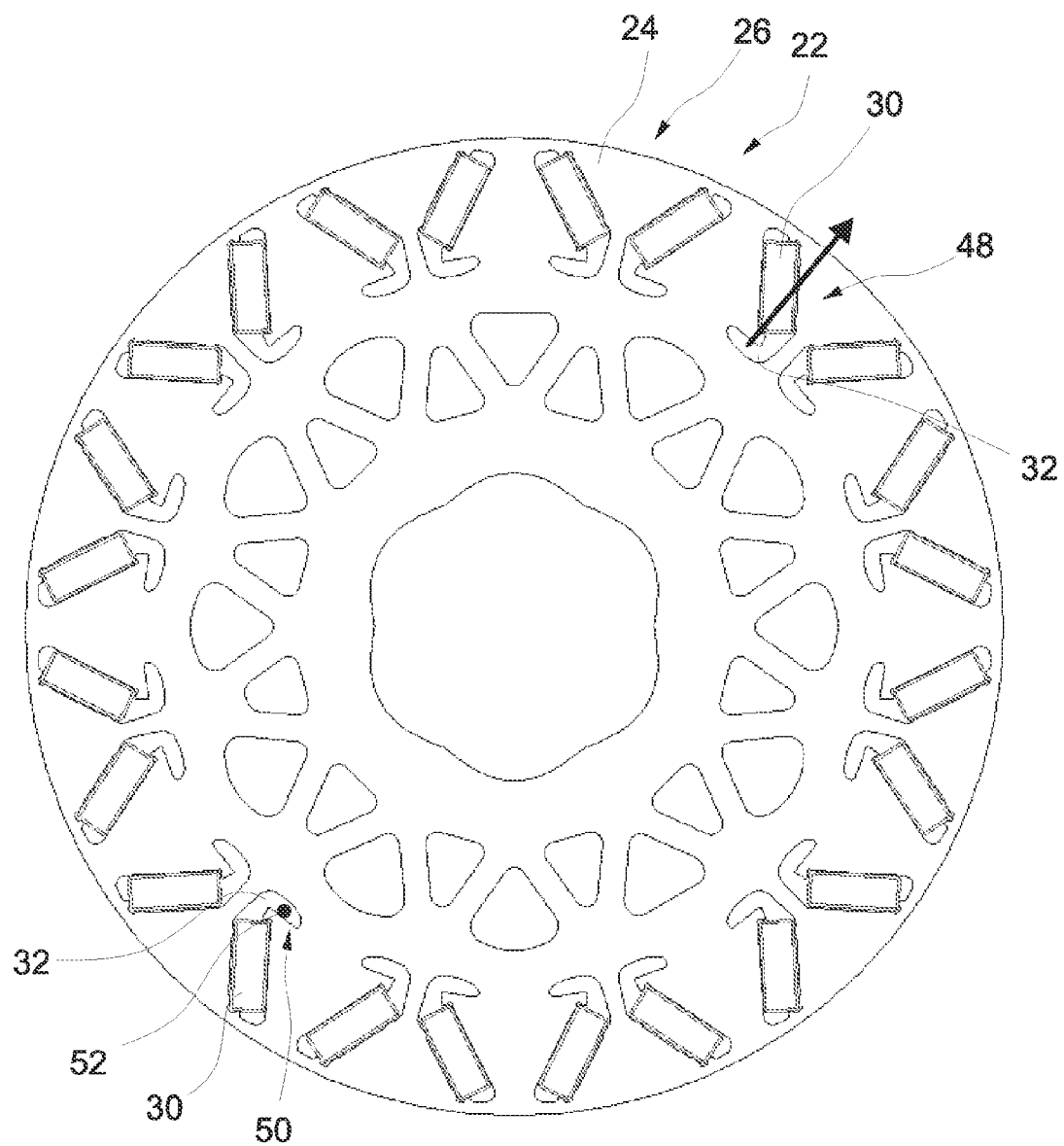
FIG. 5: shows a side view of a laminated rotor core of a rotor in a further specific embodiment of the disclosure.

FIG. 5 shows a side view of a laminated rotor core 26 of a rotor 22 in a further specific embodiment of the disclosure. The magnets 30 arranged in the laminated rotor core 26 are introduced into magnet cutouts 32 in the rotor laminations 24 arranged axially next to one another and are secured by adhesive. The magnet cutouts 32 are designed to be larger than the respective magnets 30 arranged therein. An unbalance in the laminated rotor core 26 is reduced by firstly detecting, for example measuring, an overall unbalance in the laminated rotor core 26. The overall unbalance is brought together in an effective circumferential position 48.

A first circumferential position 50 and a mass difference are then defined, via which the overall unbalance is reduced, given an assumed increase in mass by the mass difference at the first circumferential position 50. The first circumferential position 50 is arranged radially opposite the effective circumferential position 48 and is limited to the area of a magnet cutout 32. Then, at the first circumferential position 50, additional adhesive 52 is introduced into the magnet cutout 32 to reduce the overall unbalance in order to increase the mass by the extent of the mass difference.

LIST OF REFERENCE SYMBOLS

10 Electric motor
12 Stator
14 Rotation axis
16 Motor shaft
18 Toothing
20 Motor phase lead
22 Rotor
24 Rotor lamination
24.1 First rotor lamination
24.2 Second rotor lamination
24.3 Third rotor lamination
26 Laminated rotor core
28 Coil
30 Magnet
32 Magnet cutout
34 Recess
34.1 First cut-out
34.2 Second cut-out
36 Cutout volume
38 Cross-sectional area
40 Recess
40.1 First cut-out
42 Cutout volume
44 Circumferential position
46 Rotor lamination composite
48 Circumferential position
50 Circumferential position
W Angle
WA Offset angle

The invention claimed is:

1. A rotor for an electric motor, the rotor comprising:
a laminated rotor core which is rotatable about a rotation axis, having a first rotor lamination and a second rotor lamination arranged axially next to the first rotor lamination and with a plurality of magnet cutouts, in each of which magnets are arranged and secured, wherein each rotor lamination includes a plurality of circumferentially distributed cutouts at least partially coextensive along a common circumference, and the circumferentially distributed cutouts each have a cutout volume and are formed separately from the magnet cutouts, wherein at least a first cutout of the plurality of circumferentially distributed cutouts has a different shape but the same cutout volume as the plurality of circumferentially distributed cutouts, wherein the second rotor lamination is aligned rotated relative to the first rotor lamination so that the respective first cutouts are offset.

2. The rotor according to claim 1, wherein in addition to the first cutout, a second cutout of the plurality of cutouts has a different shape than the plurality of cutouts but the same cutout volume as the plurality of circumferentially distributed cutouts, wherein the second cutout is offset from the first cutout by an angle unequal to 180°.

3. The rotor according to claim 1, wherein the circumferentially distributed cutouts are arranged radially inward of the magnet cutouts.

4. The rotor according to claim 1, wherein the circumferentially distributed cutouts are arranged equidistantly around a circumference of the at least one of the rotor laminations.

5. The rotor according to claim 1, wherein to reduce an unbalance of the rotor lamination at least one of the plurality of circumferentially distributed cutouts or at least one first cutout of a plurality of further cutouts has a cutout volume that is modified compared to the plurality of the respective cutouts.

6. The rotor according to claim 1, wherein the plurality of circumferentially distributed cutouts are cooling fluid openings through which a cooling fluid flows for cooling the laminated rotor core.

7. The rotor according to claim 1, wherein the first rotor lamination has a first unbalance and the second rotor lamination has a second unbalance and the first rotor lamination in the laminated rotor core is rotated by an offset angle with respect to the second rotor lamination to reduce an overall unbalance of the laminated rotor core.

8. A rotor for an electric motor, the rotor comprising:
a laminated rotor core which is rotatable about a rotation axis, having a first rotor lamination and a second rotor lamination arranged axially next to the first rotor lamination and with a plurality of magnet cutouts, in each of which magnets are arranged and secured, wherein each rotor lamination includes a plurality of circumferentially distributed cutouts, and the circumferentially distributed cutouts each have a cutout volume and are formed separately from the magnet cutouts, wherein at least a first cutout of the plurality of circumferentially distributed cutouts has a different shape but the same cutout volume as the plurality of circumferentially distributed cutouts, wherein the second rotor lamination is aligned rotated relative to the first rotor lamination so that the respective first cutouts are offset;

wherein the first rotor lamination has a first unbalance and the second rotor lamination has a second unbalance and the first rotor lamination in the laminated rotor core is rotated by an offset angle with respect to the second rotor lamination to reduce an overall unbalance of the laminated rotor core; and wherein the offset angle is formed by a division of a full circumference of the rotor core by the number of rotor laminations.

9. An electric motor for a drive train of a vehicle, the electric motor comprising:
a stator and a rotor which is rotatable relative to the stator;
wherein the rotor includes a laminated rotor core which is rotatable about a rotation axis, having a first rotor lamination and a second rotor lamination arranged axially next to the first rotor lamination and with a plurality of magnet cutouts, in each of which magnets are arranged and secured, wherein each rotor lamination includes a plurality of circumferentially distributed cutouts at least partially coextensive along a common circumference, and the circumferentially distributed cutouts each have a cutout volume and are formed separately from the magnet cutouts, wherein at least a first cutout of the plurality of circumferentially distributed cutouts has a different shape but the same cutout volume as the plurality of circumferentially distributed cutouts, wherein the second rotor lamination is aligned rotated relative to the first rotor lamination so that the respective first cutouts are offset.

10. The electric motor according to claim 9, wherein in addition to the first cutout, a second cutout of the plurality of cutouts has a different shape than the plurality of cutouts but the same cutout volume as the plurality of circumferentially distributed cutouts, wherein the second cutout is offset from the first cutout by an angle unequal to 180°.

11. The electric motor according to claim 9, wherein the circumferentially distributed cutouts are arranged radially inward of the magnet cutouts.

12. The electric motor according to claim 9, wherein the circumferentially distributed cutouts are arranged equidistantly around a circumference of the at least one of the rotor laminations.

13. The electric motor according to claim 9, wherein to reduce an unbalance of the rotor lamination at least one of the plurality of circumferentially distributed cutouts or at least one first cutout of a plurality of further cutouts has a cutout volume that is modified compared to the plurality of the respective cutouts.

14. The electric motor according to claim 9, wherein the plurality of circumferentially distributed cutouts are cooling fluid openings through which a cooling fluid flows for cooling the laminated rotor core.

15. The electric motor according to claim 9, wherein the first rotor lamination has a first unbalance and the second rotor lamination has a second unbalance and the first rotor lamination in the laminated rotor core is rotated by an offset angle with respect to the second rotor lamination to reduce an overall unbalance of the laminated rotor core.

16. The electric motor according to claim 15, wherein the offset angle is formed by a division of a full circumference of the rotor core by the number of rotor laminations.

17. The rotor according to claim 2, wherein the plurality of circumferentially distributed cutouts are arranged equidistantly around an entirety of the circumference and are axially continuous in the rotor lamination.

* * * * *